United States Patent
Overfield et al.

(10) Patent No.: US 8,939,756 B2
(45) Date of Patent: Jan. 27, 2015

(54) MOLD-TOOL SYSTEM HAVING A MANIFOLD EXTENSION AND BIASING ASSEMBLY

(75) Inventors: Sarah Kathleen Overfield, Colchester, VT (US); James Osborne Plumpton, Enosburg Falls, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/997,671

(22) PCT Filed: Dec. 13, 2011

(86) PCT No.: PCT/US2011/064529
§ 371 (c)(1),
(2), (4) Date: Jun. 25, 2013

(87) PCT Pub. No.: WO2012/094104
PCT Pub. Date: Jul. 12, 2012

(65) Prior Publication Data
US 2013/0287888 A1    Oct. 31, 2013

Related U.S. Application Data

(60) Provisional application No. 61/429,468, filed on Jan. 4, 2011.

(51) Int. Cl.
*B29C 45/20* (2006.01)
*B29C 45/27* (2006.01)

(52) U.S. Cl.
CPC ............. *B29C 45/20* (2013.01); *B29C 45/2725* (2013.01); *B29C 2045/2733* (2013.01); *B29C 2045/2762* (2013.01); *B29C 2045/2772* (2013.01)
USPC .......................................... 425/572; 425/588

(58) Field of Classification Search
USPC ................................. 425/572, 588
See application file for complete search history.

(56) References Cited

U.S. PATENT DOCUMENTS

| | | | |
|---|---|---|---|
| 4,433,969 | A | 2/1984 | Gellert |
| 4,705,473 | A | 11/1987 | Schmidt |
| 4,832,593 | A | 5/1989 | Brown |
| 5,374,182 | A | 12/1994 | Gessner |
| 5,507,637 | A | 4/1996 | Schad et al. |
| 5,851,571 | A | 12/1998 | Manner |
| 6,220,851 | B1 | 4/2001 | Jenko |
| 6,860,732 | B2 | 3/2005 | Babin et al. |

(Continued)

FOREIGN PATENT DOCUMENTS

| | | |
|---|---|---|
| CN | 101318375 A | 12/2008 |
| FR | 2946914 A1 | 12/2010 |
| JP | 2000140710 A | 5/2000 |

OTHER PUBLICATIONS

European Search Report, Gerald Gemeinböck, Sep. 16, 2014, 6 pages.

*Primary Examiner* — Tim Heitbrink (57) ABSTRACT

A mold-tool system (100) of a runner system (150), the mold-tool system (100) comprising: a manifold extension (102) being configured to couple with a manifold assembly (152) of the runner system (150); and a biasing assembly (106) extending from the manifold extension (102), the biasing assembly (106) being configured to arrange, in use, sealing contact between the manifold extension (102) and a nozzle assembly (156).

8 Claims, 6 Drawing Sheets

(56) References Cited

U.S. PATENT DOCUMENTS

| | | |
|---|---|---|
| 7,168,941 B2 | 1/2007 | Babin et al. |
| 7,189,071 B2 | 3/2007 | Olaru |
| 7,244,118 B2 | 7/2007 | Olaru |
| 7,845,936 B2 * | 12/2010 | Babin .......................... 425/572 |
| 8,475,158 B2 * | 7/2013 | Fairy ............................ 425/570 |
| 2008/0171100 A1 | 7/2008 | Bouti |
| 2008/0279978 A1 | 11/2008 | Babin et al. |

* cited by examiner

MOLD-TOOL SYSTEM HAVING A MANIFOLD EXTENSION AND BIASING ASSEMBLY

TECHNICAL FIELD

An aspect generally relates to (but is not limited to) mold-tool systems including (but not limited to): (i) a manifold extension configured to couple with a manifold assembly of a runner system, and (ii) a biasing assembly extending from the manifold extension, the biasing assembly configured to arrange, in use, sealing contact between the manifold extension and a nozzle assembly.

BACKGROUND

Known hot-runner systems convey molten, pressurized resin (hereafter referred to as the "resin") from a machine nozzle of an injection molding system to one or more mold cavities associated with a mold assembly. The hot-runner system is supported by a platen structure of the injection molding system. In the known hot-runner system, a sprue receives the resin from the machine nozzle and transfers the resin to a manifold assembly of the hot-runner system. The manifold assembly distributes the resin to one or more outlets (also called "drops"). At each outlet of the manifold assembly, a nozzle receives the resin and transfers the resin to a mold cavity.

U.S. Pat. No. 4,832,593 discloses a system for injection molding large parts. The system includes a large diameter hot runner valve gated nozzle assembly which can be removed for servicing. The assembly includes a heated nozzle body having a substantially C-shaped flow channel for conveying molten plastic to a nozzle having an injection gate and a valve arrangement for opening and closing the injection gate. The assembly further includes a nozzle extension attached to the nozzle body so as to accommodate thermal expansion of the nozzle extension. A manifold for supplying molten plastic material to the nozzle assembly is mounted and retained within a slot in the nozzle extension so as to permit sliding action of the manifold.

U.S. Pat. No. 5,507,637 discloses a nozzle-manifold assembly having utility in injection molding machines for making molded plastic articles. The nozzle assembly employs a clamp ring to apply a clamping force to the nozzle housing to cause it to mate with a manifold so as to prevent leakage of molten plastic material between the nozzle housing and the manifold. The clamp ring is mounted to the manifold by a plurality of screws whose tightening creates the desired clamping force and an effective seal between the nozzle housing and the manifold. The nozzle-manifold assembly also includes a centering ring for positioning the nozzle housing within a bore in a mold plate.

U.S. Pat. No. 6,220,851 discloses an apparatus and a process for injecting a molten plastic material. The apparatus includes a nozzle assembly through which the plastic material flows and include a nozzle body with a heater affixed thereto. A mold cavity plate is positioned adjacent the nozzle body and is separable from the nozzle body so that separation of the mold cavity plate from the nozzle body exposes the nozzle body and permits removal of the nozzle body and the heater.

U.S. Pat. No. 6,860,732 discloses a seal, which is provided between a nozzle and a manifold. The seal provides a melt channel between an outlet of the manifold and a nozzle channel. The seal has higher thermal expansion coefficient than both the nozzle and the manifold to provide an improved seal between the manifold and the nozzle when the is injection molding apparatus is at an operating temperature.

U.S. Pat. No. 7,168,941 discloses a seal, which is provided between a nozzle and a manifold. The seal provides a melt channel between an outlet of the manifold and a nozzle channel. The seal has higher thermal expansion coefficient than both the nozzle and the manifold to provide an improved seal between the manifold and the nozzle when the injection molding apparatus is at an operating temperature.

U.S. Pat. No. 7,189,071 discloses an injection molding apparatus, which includes a manifold having a manifold melt channel, a nozzle having a nozzle melt channel, a slidable seal having seal melt channel located between the nozzle and the manifold melt channels, and a biasing element that provides sealing contact between the slidable seal and the manifold and nozzle to maintain a sealed melt path through the manifold, seal and nozzle melt channels.

U.S. Pat. No. 7,244,118 discloses an injection molding apparatus, which includes combined sealing elements located between a nozzle head of an injection molding nozzle and a mold plate. The sealing elements are arranged so that they force the nozzle head toward an outlet surface of a manifold and provide a seal therebetween over a range of temperatures.

SUMMARY

The inventors have researched a problem associated with known runner system that may inadvertently manufacture bad-quality molded articles or parts or may have other problems associated with their usage. After much study, the inventors believe they have arrived at an understanding of the problem and its solution, which are stated below, and the inventors believe this understanding may not be known to the public.

The resin should be contained within the hot-runner system (that is, it may be an advantage to avoid leakage of the resin). Resin leakage from any of the interfaces associated with the manifold assembly may lead to inadvertent and/or undesirable loss of production through increased downtime for maintenance and/or replacement of damaged components, etc. Maintaining reliable seals between the components of the hot-runner system may be of critical importance to maximize uptime and productivity. This invention describes a new approach for creating the seal between the manifold and nozzles of hot runner systems.

A known nozzle-to-manifold connection in the hot-runner system may include the following components: a manifold assembly, a nozzle, a backing plate, a manifold plate, and an insulating component. The components may be arranged so that: (i) the manifold assembly may be spaced from the backing plate by the insulating component, (ii) a nozzle head (or a separate retaining component) may be captured between the manifold assembly and a bore in the manifold plate, and (iii) the manifold plate may be fastened to the backing plate. In order to seal the resin that is transferred from the manifold assembly to a housing of the nozzle, a sealing load may be applied between the manifold assembly and the housing of the nozzle thereby reducing and/or eliminating leakage of the resin from the manifold assembly-to-housing interface.

The sealing load may be at an amount that: (i) does not allow the resin to escape, and (ii) does not lead to a load related damage to sealing surfaces through galling or indentation, etc. The sealing load may be generated by a thermal expansion of the components used in the manifold assembly. During operation, the manifold assembly and the nozzle may be heated to a resin-processing temperature (also known as the "operating temperature"), while the manifold plates and the backing plates may be cooled to a required mold temperature. Thermal expansion of the manifold assembly and the nozzle may be constrained by a bore in the manifold plate and fasteners holding the manifold plate and backing plate together. This condition (i.e., thermal expansion) may generate the required seal load.

The nozzle is also located in a mold frame by the bore within the manifold plate. The nozzle may be substantially stationary in the x-y plane of the mold frame. In this system, the z direction is parallel to the axis of the machine nozzle. The manifold x-y origin is located at a position remote from the nozzle's location. When the components of the hot-runner system are heated to the operating temperature, the components may experience thermal growth in the x, y, and z directions. The retaining plates are not typically heated to the processing temperature. The temperature difference in conjunction with the component location difference between the manifold assembly and the nozzle leads to relative movement between the manifold assembly and the nozzle during a heat-up phase. Growth in the z direction for may increase the load generated at the seal faces. Growth in the x-y plane may lead to the manifold assembly and the nozzle sliding against each other during the heat-up phase. The sliding action while under the load designed to seal the interface may lead to damage of the sliding surfaces.

Variations to the approach described above have been introduced, such as: compliant features to decrease the load range generated, crush seals to lower the load required to seal, and/or high thermal expansion seal tubes that allow for lower cold loads and/or higher hot loads, and/or directly clamping the nozzle to the manifold.

The limitations of this approach may be as follows: high loads generated by noncompliant components, large load range due to noncompliant components, temperature sensitivity to sealing due to reliance upon thermal expansion, and surface damage due to thermal growth. Also, the practice of using fasteners to resist the load generated during thermal growth may limit the allowable pitch density. An inadequate number and position of fasteners may lead to leakage at the seal faces. Inadequate material support under the nozzle bore shoulder may lead to local plate deformation that may result in plate damage and tip position variation. Clamping rings may be bulky items that also limit the pitch spacing.

An alternative configuration that is less commonly used is the practice of threading the nozzle directly to the manifold. This approach may alleviate the load sensitivity issues, however the differential in position during the heat up phase still exists. In this case, excessive thermal growth may compromise the nozzle position causing it to tilt or be damaged and leak. This approach may be applied to layouts where the manifold growth distance is limited.

The inventors believe that a disadvantage of the known manifold-to-nozzle seal approach is that the nozzle is contained within the hot-runner assembly. The nozzle may only be removed by unfastening the manifold plate and backing plate and then removing the manifold assembly from the manifold plate to expose the nozzle. This procedure may not suitable for in-machine maintenance.

According to one aspect, there is provided a mold-tool system (100) of a runner system (150), the mold-tool system (100) comprising: a manifold extension (102) being configured to couple with a manifold assembly (152) of the runner system (150); and a biasing assembly (106) extending from the manifold extension (102), the biasing assembly (106) being configured to arrange, in use, sealing contact between the manifold extension (102) and a nozzle assembly (156).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

Specifically, the mold-tool system (100) may be used in an injection molding system (not depicted but known). More specifically, the mold-tool system (100) may be used in a hot-runner (known but not depicted) of the injection molding system. The mold-tool system (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in to the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in is the claim.

Figure 1A:
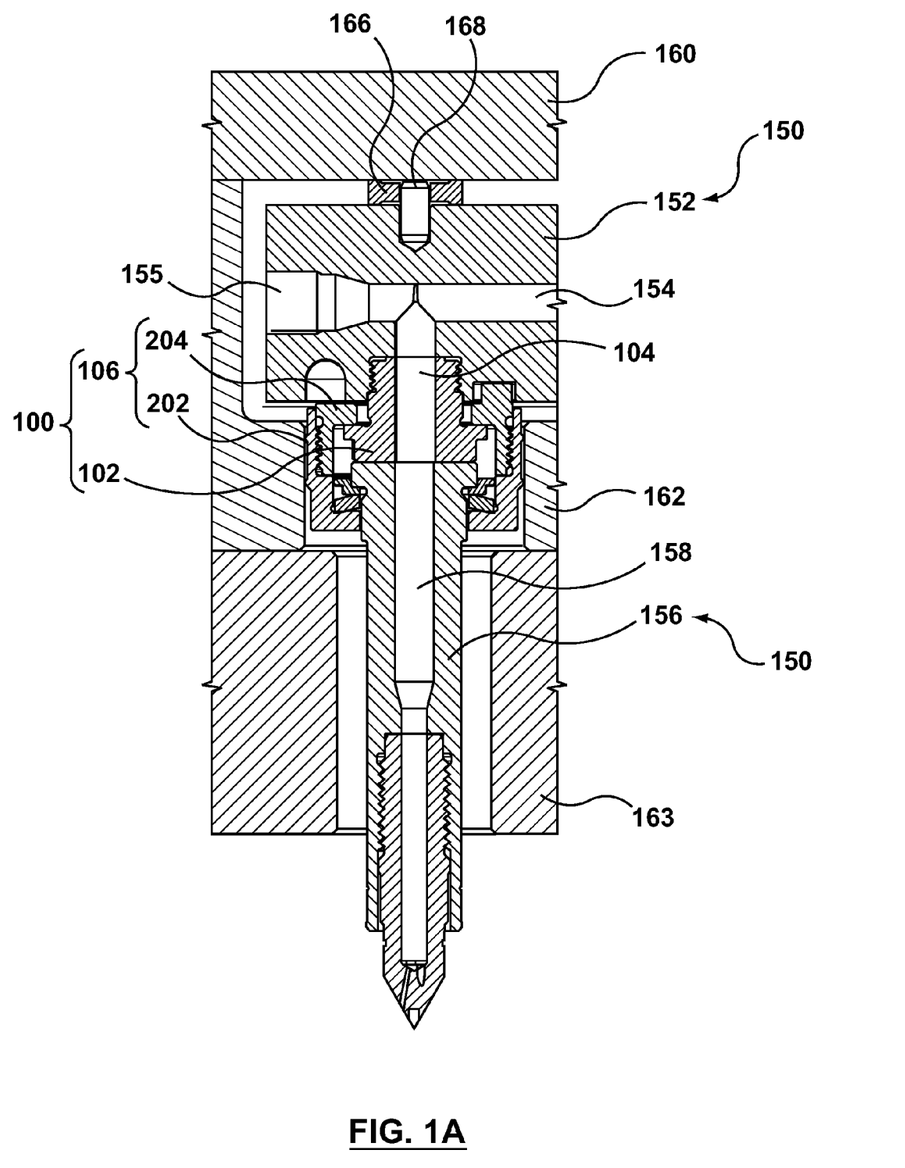
FIGS. 1A, 1B, 2, 3A, 3B and 4 depict examples of schematic representations of a mold-tool system (100).
Figure 1B:
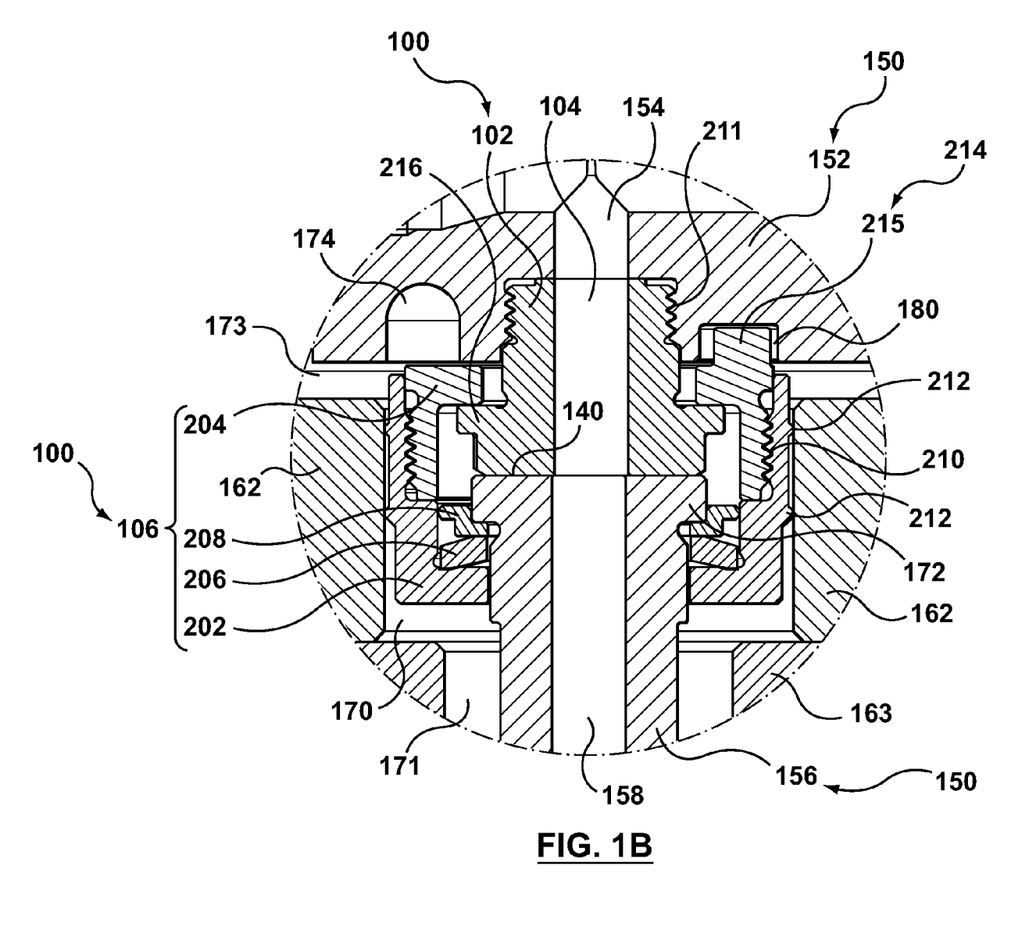

FIGS. 1A and 1B depict a cross sectional views of a first example of the mold-tool system (100). The mold-tool system (100) is for use with a runner system (150). Generally speaking, the mold-tool system (100) includes (and is not limited to): a combination of (i) a manifold extension (102), and (ii) a biasing assembly (106). More specifically, the manifold extension (102) is configured (without limitation to any specific physical arrangement) to couple (in use) with a manifold assembly (152) of the runner system (150). The biasing assembly (106) extends from the manifold extension (102). More specifically, the biasing assembly (106) is configured (without limitation to any specific physical arrangement) to arrange (in use) sealing contact between the manifold extension (102) and a nozzle assembly (156). Even more specifically, the manifold extension (102) defines an extension melt channel (104) that is configured, in use, to be in fluid communication with a manifold-melt channel (154) that is defined by the manifold assembly (152). For the case where the biasing assembly (106) arranges sealing contact between the manifold extension (102) and a nozzle assembly (156), the extension melt channel (104) is in fluid communication with a nozzle channel (158) being defined by a nozzle assembly (156). To be clear, the extension melt channel (104) is in fluid communication with a nozzle channel (158) being defined by the nozzle assembly (156) in response to the biasing assembly (106) arranging sealing contact between the manifold extension (102) and the nozzle assembly (156).

The mold-tool system (100) may create a seal between the manifold assembly (152) and the nozzle assembly (156) that may permits removal of the nozzle assembly (156) while the runner system (150) remains mounted in the injection molding system. The mold-tool system (100) may also lower both the load range and the maximum load applied, which may result in less component damage. Additionally, the mold-tool system (100) may eliminate plate deflection and fastening issues described above (in the Summary Section) that may lead to nozzle seal wear and leakage, processing issues, and mold wear, etc.

In general terms, the mold-tool system (100) may permit removal of the manifold plate (162) and the backing plate (160) from the load-generation function, and the manifold plate (162) and the backing plate (160) may be replaced by the combination of the combination of (i) the manifold extension (102), and (ii) the biasing assembly (106), which may generate the sealing load, positions the nozzle assembly (156) in the x-y plane, allows removal of the nozzle assembly (156) in the press (that is, from the injection molding system), allows thermal growth of the manifold assembly (152), and/or minimizes the applied load.

Features of the mold-tool system (100) may include (and are not limited to):
 (i) a feature or component, such as the manifold extension (102), that is fixed to the manifold assembly (152), and the manifold extension (102) may provide a surface (140) for the biasing assembly (106) to bear against;
 (ii) a compliant feature, such as a spring assembly (206) as indicated in FIG. 1B, which is configured to manage the applied load;
 (iii) a locating feature (212) as depicted in FIG. 1B, which is configured to locate and position the nozzle assembly (156) in the manifold plate (162); and/or
 (iv) a fastening feature, such as threads (for example) that are used to fasten a nozzle collar (202) with a manifold collar (204) as depicted in FIG. 1B, which is configured to generate, in use, the applied load.

Some technical effects associated with usage of the mold-tool system (100): removal of the plates from the load generation function may be accomplished while simultaneously allowing relative movement between the manifold assembly (152) and the nozzle assembly (156), minimizing the load required to seal, and/or minimizing the installation size, etc.

FIG. 1A depicts, by way of example, the runner system (150) that may include (and is not limited to): (i) a backing plate (160), a manifold plate (162), a spacer plate (163), a back-up pad (166), an alignment mechanism (168) such as a spring dowel, and a plug receiver (155), which are all known components and thus are not described here in any specific details.

FIG. 1B depicts, by way of example, a close-up cross sectional view of the runner system (150) that may include (and not limited to): (i) an air gap (170) defined by the manifold plate (162), (ii) an air gap (171) defined by the spacer plate (163), (iii) a nozzle shoulder (172) being provided by the nozzle assembly (156), (iv) an air gap (173) defined between the manifold plate (162) and the manifold assembly (152), and (v) a manifold heater (174) being supported by the manifold assembly (152), which are known components and thus are not described here in any specific details.

FIG. 1B depicts additional details of the mold-tool system (100), in which the mold-tool system (100) may be arranged so that the biasing assembly (106) may include (by way of example and is not limited to): (i) a nozzle collar (202), (ii) a manifold collar (204), (ii) a spring assembly (206), and (iv) a locator (208). The biasing assembly (106) may also include other features (and not limited to): a threaded connection (210), a threadable connection (211), a locating feature (212), an anti-rotation feature (214), and an extension shoulder (216). As depicted in FIG. 1B, the anti-rotation feature (214) may be, for example, a tab (215) extending from the manifold extension (102), and the tab (215) fits into a slot (180) defined by the manifold assembly (152), the slot (180) faces the manifold extension (102). The anti-rotation feature (214) may be included and used to prevent inadvertent rotation of the biasing assembly (106).

The manifold collar (204) may be externally threaded. The manifold collar (204) may have the anti-rotation feature (214), which may be called a tab or a key, which fits in the slot (180) defined in the manifold assembly (152). The manifold extension (102) may be externally threaded. The manifold extension (102) may be fastened or connected or coupled to the manifold assembly (152). The manifold extension (102) may provide the extension shoulder (216) upon which the manifold collar (204) may seat. The manifold extension (102) may trap the manifold collar (204) to the manifold assembly (152) during assembly of the mold-tool system (100). The nozzle assembly (156) may abut the manifold extension (102). The locator (208) may engage a locating diameter of the nozzle assembly (156) and a locating diameter on the nozzle shoulder (172). The locator (208) may provide a bearing surface for the spring assembly (206). The spring assembly (206) may be compressed by the assembly of the nozzle collar (202) to the manifold collar (204). The nozzle collar (202) and the manifold collar (204) may limit compression of the spring assembly (206), which then limits the load applied to the nozzle assembly (156) and then to the interface with the manifold extension (102). During thermal growth of the manifold assembly (152), the manifold extension (102) may slide with respect to the nozzle assembly (156) and the manifold collar (204). The nozzle collar (202) may be aligned with the manifold-melt channel (154) of the manifold assembly (152). This arrangement provides the x-y location for the nozzle assembly (156). The interface for the nozzle assembly (156) to the nozzle collar (202) may be keyed to allow the nozzle collar (202) to be rotated by the rotation of the nozzle assembly (156).

The following describes the sequence (that is, operation) for assembling the mold-tool system (100): and operation (A) that may include (and is not limited to): placing the manifold collar (204) on the manifold assembly (152), and aligning the tab (215) with the slot (218). The sequence for assembling the mold-tool system (100) may further include (and is not limited to): an operation (B) that may include (and is not limited to): threading the manifold extension (102) to the manifold assembly (152) through the manifold collar (204), and the manifold collar (204) may be loosely retained to the manifold assembly (152) by the manifold extension (102). The sequence for assembling the mold-tool system (100) may further include (and is not limited to): an operation (C) may include (and is not limited to): placing the manifold assembly (152) in the manifold plate (162), and retaining the manifold assembly (152) to the manifold plate (162). The sequence for assembling the mold-tool system (100) may further include (and is not limited to): an operation (D) that may include (and is not limited to): exposing a clamp side of the manifold plate (162); it is understood that the clamp side of the manifold plate (162) is the side that faces a platen and does not face a mold assembly; and placing the nozzle assembly (156) on the manifold extension (102). The sequence for assembling the mold-tool system (100) may further include (and is not limited to): an operation (E) that may include (and is not limited to): sliding the locator (208), the spring assembly (206), and the nozzle collar (202) over the nozzle assembly (156). The sequence for assembling the mold-tool system (100) may further include (and is not limited to): an operation (F) that may include (and is not limited to): threading the nozzle collar (202) onto the manifold collar (204).

For the case where the components of the mold-tool system (100), as depicted in FIG. 1B, are assembled, the biasing assembly (106) may include the following structural configurations (which may be called "limitations"): a limitation (A), which may include (and is not limited to): the manifold collar (204) being configured to contact an extension shoulder (216) of the manifold extension (102), the extension shoulder (216) being set apart from the manifold assembly (152), so that that at least a part of the manifold collar (204) is placed between the manifold extension (102) and the manifold assembly (152). The biasing assembly (106) may further include the following structural configurations: a limitation (B), which may include (and is not limited to): the nozzle collar (202) being configured to connect with the manifold collar (204), the nozzle collar (202) extending toward the nozzle assembly (156). The biasing assembly (106) may include the following structural configurations (which may be called "limitations"): a limitation (C), which may include (and is not limited to): the locator (208) being configured to abut a nozzle shoulder (172) of the nozzle assembly (156), to the locator (208) extending toward the nozzle collar (202). The biasing assembly (106) may include the following structural configurations (which may be called "limitations"): a limitation (D), which may include (and is not limited to): the spring assembly (206) being configured for placement between the locator (208) and the nozzle collar (202).

Figure 2:
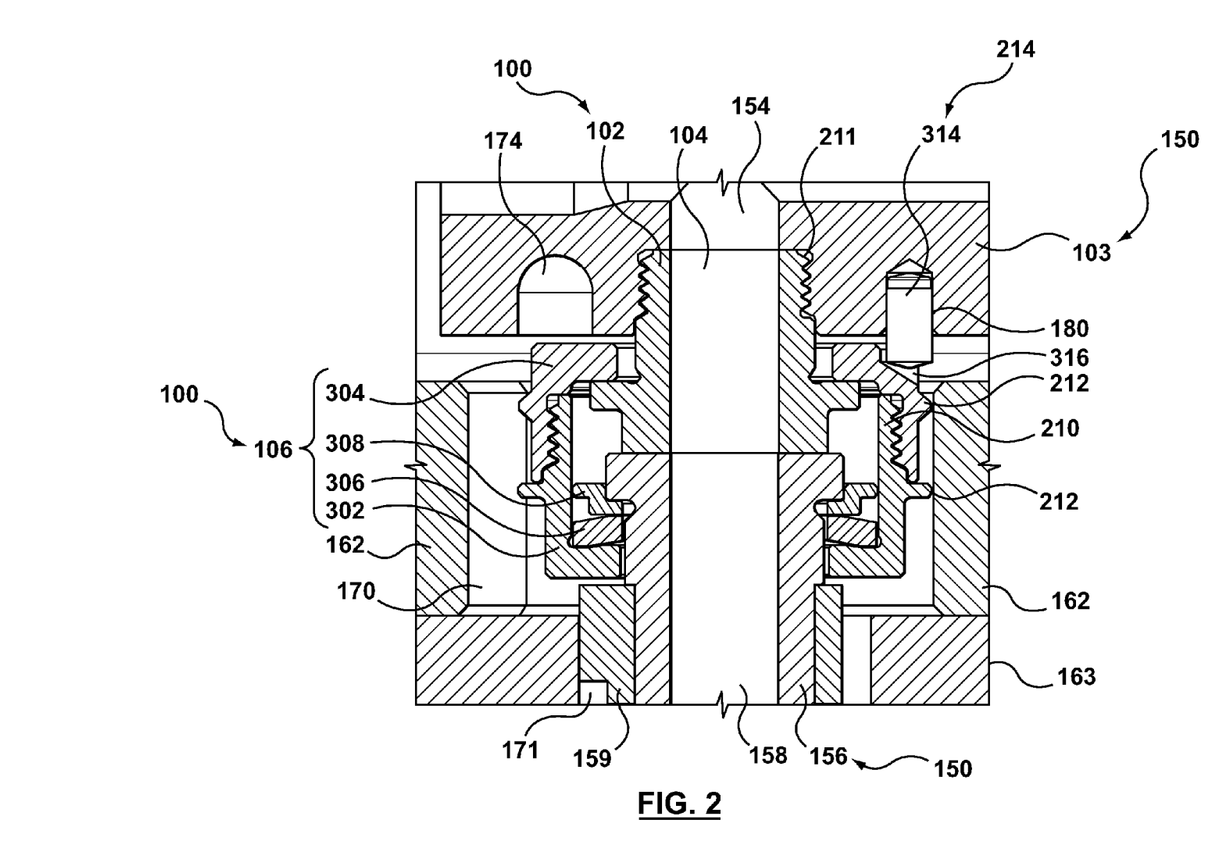

FIG. 2 depicts a cross sectional view of a second example of the mold-tool system (100). According to the second example, the mold-tool system (100) may be further adapted so that the biasing assembly (106) may include (and is not limited to): a nozzle collar (302), a manifold collar (304), a spring assembly (306), and a locator (308). FIG. 2 depicts a variation of the mold-tool system (100). The second example of the mold-tool system (100) is similar to the first example of the mold-tool system (100) as depicted in FIGS. 1A, 1B. According to the second example of the mold-tool system (100), the manifold collar (304) is internally threaded and has a locating feature (212) that is configured, in use, to interface with a location of a bore defined by the manifold plate (162). The nozzle collar (302) is externally threaded. The nozzle collar (302) also has a locating feature (212) that is configured, in use, to interface with the location of the bore defined by the manifold plate (162). The anti-rotation feature (214) may include a dowel (314) that is received in the slot (180), and the dowel (314) abuts with a notch (316) of the manifold collar (304). The notch (316) may be called a clearance hole. A nozzle heater (159) may be connected with the nozzle assembly (156).

Figure 3A:
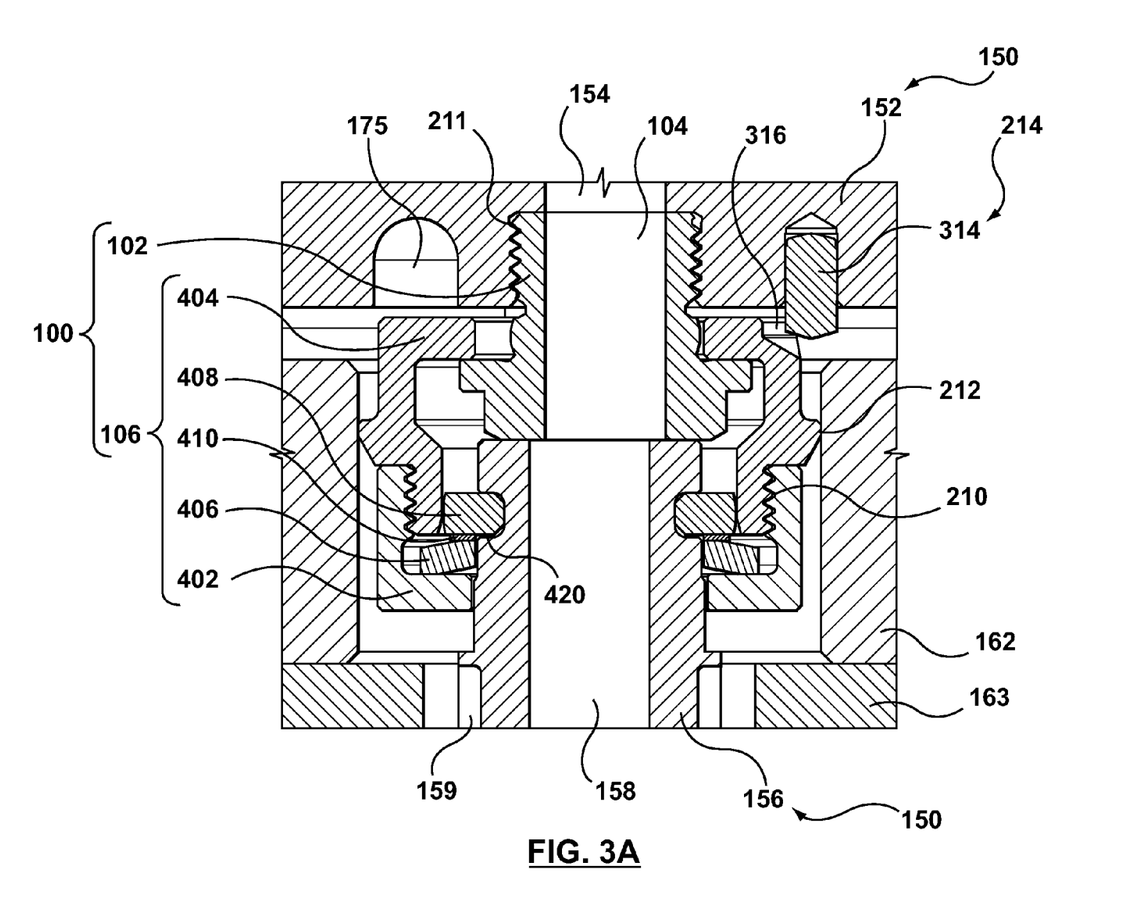
Figure 3B:
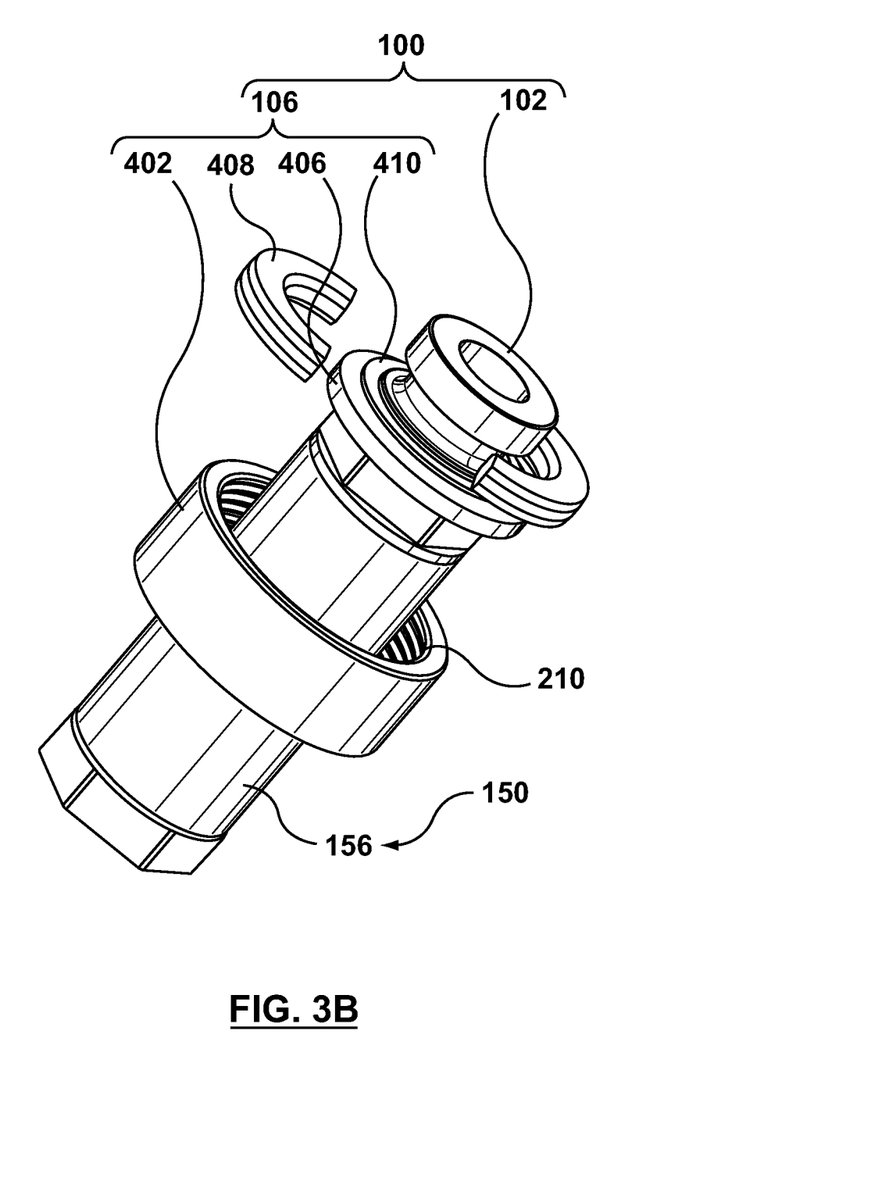

FIGS. 3A and 3B depict a third example of the mold-tool system (100). FIG. 3A depicts a cross sectional view of the mold-tool system (100). FIG. 3B depicts a partial perspective view of the mold-tool system (100). According to the third example, the mold-tool system (100) may be adapted so that the biasing assembly (106) may include (and is not limited to): a nozzle collar (402), a manifold collar (404), a spring assembly (406), a locator (408), and a spacer (410). FIG. 3A depicts a variation of the mold-tool system (100). The third example of the mold-tool system (100) includes (and is not limited to) a locator (408), which has two pieces, that is configured to transmit a spring load to the nozzle assembly (156). The sequence for assembling the arrangement depicted in FIG. 3A starts the same way as the first example of the mold-tool system (100) as depicted in FIGS. 1A, 1B, with the manifold extension (102) trapping the manifold collar (404) as the manifold extension (102) threadably connects with the manifold assembly (152). Instead of a key and slot providing the anti-rotation function for the manifold collar (404), a dowel (314) may be used. On the nozzle side, the nozzle collar (402), the spring assembly (406) and a spacer (410) (which may also be called a "washer") may slide over the nozzle assembly (156) from the side that may be mated to the manifold extension (102). The locator (408) may then be placed in a receiving groove (420) defined in a side wall of the nozzle assembly (156). Then the manifold collar (404) may be threadably connected to the manifold extension (102) via threaded connection (210). A groove (175) is defined in the manifold assembly (152), and the groove (175) is configured to receive a manifold heater. In summary, the biasing assembly (106) depicted in FIG. 3A may include (and is not limited to): the nozzle collar (402) configured to receive the nozzle assembly (156), the manifold collar (404) configured to receive the manifold extension (102), the spring assembly (406) configured to abut the nozzle collar (402), the locator (408) that is received in a receiving groove (420) defined in a side wall of the nozzle assembly (156), and a spacer (410) that is positioned between the spring assembly (406) and the locator (408).

Figure 4:
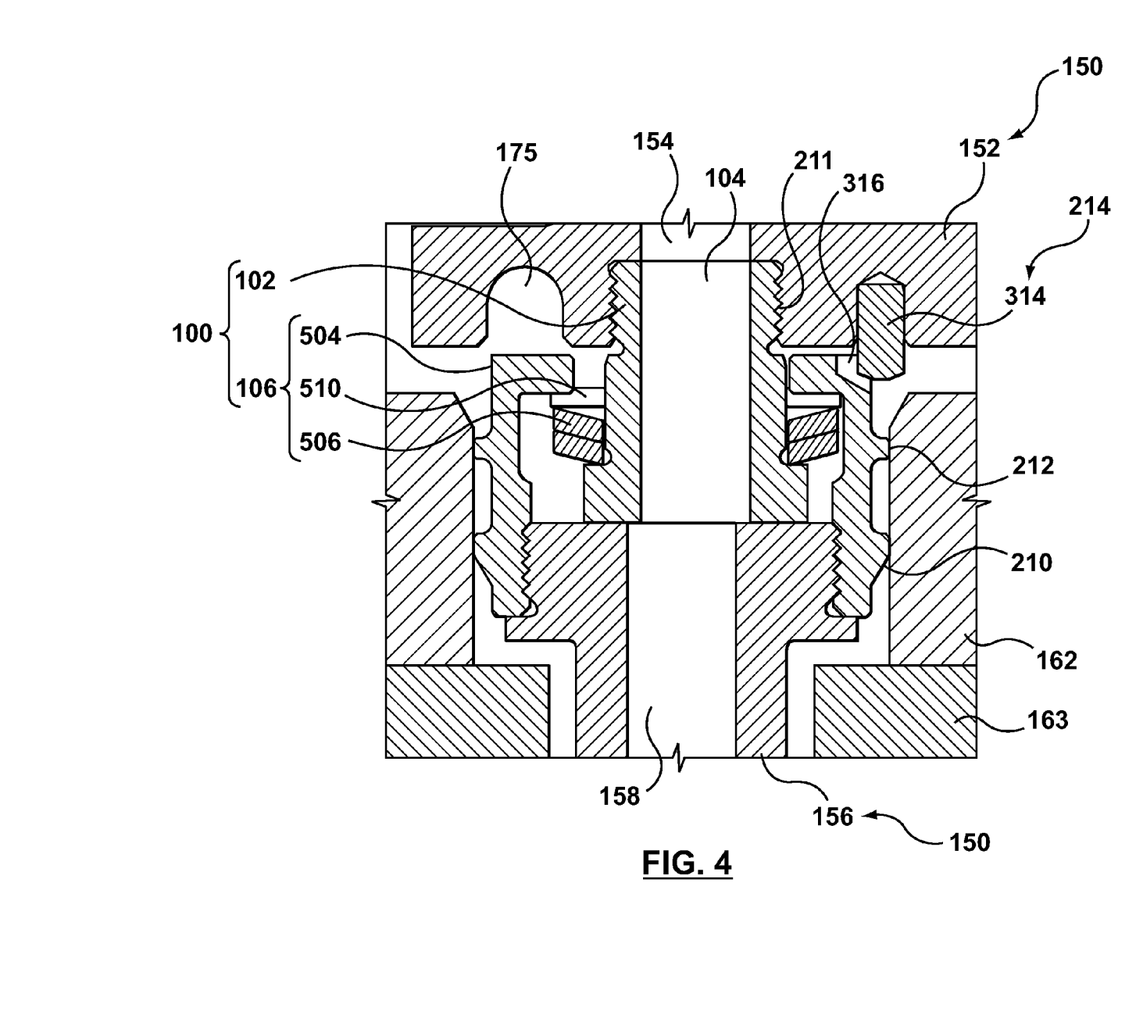

FIG. 4 depicts a cross sectional view of a fourth example of the mold-tool system (100). According to the fourth example, the mold-tool system (100) may be adapted so that the biasing assembly (106) may include (and is not limited to): a manifold collar (504), a spring assembly (506), a spacer (510). FIG. 4 depicts a variation of the mold-tool system (100). The fourth example of the mold-tool system (100) combines the retention function of the nozzle collar (502) with the nozzle assembly (156). An end of the nozzle assembly (156) is threaded to mate to the manifold collar (504). The spring assembly (506) and the spacer (510) may then be placed on the manifold-collar side of the mold-tool system (100). In summary, the biasing assembly (106) depicted in FIG. 4 may include (and it not limited to): the manifold collar (504) that is configured to receive the nozzle assembly (156) and also configured to receive the manifold extension (102), and a spring assembly (506) that is configured to interact between the manifold extension (102) and with the manifold collar (504). It will be appreciated that any variation in placement of the location features, spring assemblies and anti-rotation features may be made without deviating from the principle of the mold-tool system (100) while still providing the sealing load function.

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system (100), comprising:
a manifold extension (102) being configured to couple with a manifold assembly (152) of a runner system (150); and
a biasing assembly (106) extending from the manifold extension (102) and retaining a nozzle assembly to the manifold extension, the biasing assembly (106) being configured to generate a sealing load between the manifold extension (102) and the nozzle assembly (156), the biasing assembly includes:
a nozzle collar being configured to receive the nozzle assembly;
a manifold collar being configured to receive the manifold extension;
a spring assembly being configured to abut the nozzle collar;
a locator being received in a receiving groove defined in a side wall of the nozzle assembly; and
a spacer being positioned between the spring assembly and the locator
wherein:
the manifold extension defines an extension melt channel being configured, in use, to be in fluid communication with a manifold-melt channel being defined by the manifold assembly;
the extension melt channel is in fluid communication with a nozzle channel being defined by the nozzle assembly in response to the biasing assembly arranging sealing contact between the manifold extension and the nozzle assembly.

2. The mold-tool system (100) of claim 1, wherein:
the manifold collar (204) being configured to contact an extension shoulder (216) of the manifold extension (102), the extension shoulder (216) being set apart from the manifold assembly (152), so that at least a part of the manifold collar (204) is placed between the manifold extension (102) and the manifold assembly (152);
the nozzle collar (202) being configured to connect with the manifold collar (204), the nozzle collar (202) extending toward the nozzle assembly (156);
the locator (208) being configured to abut a nozzle shoulder (172) of the nozzle assembly (156), the locator (208) extending toward the nozzle collar (202); and
the spring assembly (206) being configured for placement between the locator (208) and the nozzle collar (202).

3. The mold-tool system (100) of claim 1, wherein:
the biasing assembly (106) includes:
an anti-rotation feature (214) having a dowel (314) being received in a slot (180) of the manifold assembly (152), and the dowel (314) abuts with a notch (316) of a manifold collar (304).

4. A mold-tool system, comprising:
a manifold extension being configured to couple with a manifold assembly of a runner system; and
a biasing assembly extending from the manifold extension to retain a nozzle assembly to the manifold extension, the biasing assembly including:
a manifold collar being configured to contact an extension shoulder of the manifold extension, the extension shoulder being set apart from the manifold assembly, so that at least a part of the manifold collar is placed between the manifold extension and the manifold assembly;
a nozzle collar being configured to connect with the manifold collar, the nozzle collar extending toward the nozzle assembly;
a locator being configured to abut a nozzle shoulder of the nozzle assembly, the locator extending toward the nozzle collar; and
a spring assembly being configured for placement between the locator and the nozzle collar.

5. The mold-tool system of claim 4, wherein the biasing assembly further includes an anti-rotation feature having a dowel being received in a slot of the manifold assembly, and the dowel abuts with a notch of a manifold collar.

6. The mold-tool system of claim 4, wherein:
the manifold extension defines an extension melt channel being configured, in use, to be in fluid communication with a manifold-melt channel being defined by the manifold assembly; and
the extension melt channel is in fluid communication with a nozzle channel being defined by the nozzle assembly in response to the biasing assembly arranging sealing contact between the manifold extension and the nozzle assembly.

7. A mold-tool system, comprising:
a manifold extension being configured to couple with a manifold assembly of a runner system; and
a biasing assembly extending from the manifold extension to retain a nozzle assembly to the manifold extension, the biasing assembly including:
a manifold collar being configured to receive the nozzle assembly and also configured to receive the manifold extension; and
a spring assembly being configured to interact between the manifold extension and with the manifold collar.

8. The mold-tool system of claim 7, wherein:
the manifold extension defines an extension melt channel being configured, in use, to be in fluid communication with a manifold-melt channel being defined by the manifold assembly; and
the extension melt channel is in fluid communication with a nozzle channel being defined by the nozzle assembly in response to the biasing assembly arranging sealing contact between extension and the nozzle assembly.

* * * * *